United States Patent
Ji et al.

(10) Patent No.: US 9,173,121 B2
(45) Date of Patent: Oct. 27, 2015

(54) METHOD AND APPARATUS FOR RESTRICTED MEASURING IN A WIRELESS NETWORK

(75) Inventors: Tingfang Ji, San Diego, CA (US); Aleksandar Damnjanovic, Del Mar, CA (US); Juan Montojo, San Diego, CA (US); Alan Barbieri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 652 days.

(21) Appl. No.: 13/277,177

(22) Filed: Oct. 19, 2011

(65) Prior Publication Data

US 2012/0275322 A1 Nov. 1, 2012

Related U.S. Application Data

(60) Provisional application No. 61/409,069, filed on Nov. 1, 2010, provisional application No. 61/413,861, filed on Nov. 15, 2010.

(51) Int. Cl.
*H04L 1/00* (2006.01)
*H04W 24/10* (2009.01)
(Continued)

(52) U.S. Cl.
CPC ............ *H04W 24/10* (2013.01); *H04L 1/0027* (2013.01); *H04L 1/0028* (2013.01); *H04L 1/20* (2013.01); *H04W 88/02* (2013.01)

(58) Field of Classification Search
CPC .................................................... H04W 24/10
USPC .......................................... 370/252; 455/515
See application file for complete search history.

(56) References Cited

U.S. PATENT DOCUMENTS

| 7,453,801 | B2 | 11/2008 | Taneja et al. |
| 7,570,627 | B2 | 8/2009 | Welborn et al. |
| 7,801,490 | B1 | 9/2010 | Scherzer |

(Continued)

FOREIGN PATENT DOCUMENTS

| EP | 2148546 A1 | 1/2010 |
| JP | 2007336176 A | 12/2007 |

(Continued)

OTHER PUBLICATIONS

Notification of Transmittal of the International Search Report and the Written Opinion of the International Searching Authority, or the Declaration, International Search Report, and Written Opinion mailed on Feb. 9, 2012 in International Application No. PCT/US2011/057149.

(Continued)

*Primary Examiner* — Dang Ton
*Assistant Examiner* — Kevin Lee
(74) *Attorney, Agent, or Firm* — Arent Fox LLP

(57) ABSTRACT

Methods and apparatuses are provided that include determining resources over which to measure signals from a base station. One or more parameters related to a resource restriction pattern can be provided to the device for measuring signals over indicated resources. The resource restricted pattern can correspond to a bitmap where each bit relates to a time period over which signals can be transmitted by the base station, and the bit can specify whether a signal received over the resource should be measured. The resource restriction pattern can correspond to a set or protected resources negotiated using a resource partitioning scheme.

42 Claims, 11 Drawing Sheets

(51) Int. Cl.
*H04L 1/20* (2006.01)
*H04W 88/02* (2009.01)

(56) References Cited

U.S. PATENT DOCUMENTS

| | | | |
|---|---|---|---|
| 2007/0293230 A1 | 12/2007 | Lee | |
| 2008/0118013 A1 | 5/2008 | Vis et al. | |
| 2009/0268684 A1 | 10/2009 | Lott et al. | |
| 2011/0003599 A1 | 1/2011 | Kanzaki et al. | |
| 2011/0044269 A1 | 2/2011 | Fan et al. | |
| 2011/0188481 A1 | 8/2011 | Damnjanovic et al. | |
| 2011/0275394 A1 | 11/2011 | Song et al. | |
| 2012/0088516 A1 | 4/2012 | Ji et al. | |
| 2013/0176887 A1* | 7/2013 | Seo et al. | 370/252 |

FOREIGN PATENT DOCUMENTS

| | | |
|---|---|---|
| KR | 20070060295 A | 6/2007 |
| WO | 2004084509 A2 | 9/2004 |
| WO | 2009134921 A1 | 11/2009 |
| WO | 2012057462 A1 | 5/2012 |

OTHER PUBLICATIONS

Alcatel-Lucent, et al., "Way Forward on time-domain extension of Rel 8/9 backhaul-based ICIC," TSG-RAN WG1 Meeting #62bis, Xi'an, P. R. China, Oct. 11-15, 2010, Agenda Item: 6.8.1.1, R1-105749, pp. 1-4.

AT&T, et al., "Way Forward on eICIC for non-CA based HetNets," TSG-RAN WG1 Meeting #62, Madrid, Spain, Aug. 23-Aug. 27, 2010, Agenda Item: 6.8, R1-105082, 2 pages.

MCC Support, "Draft Report of 3GPP TSG RAN WG1 #62 v0.1.0," 3GPP TSG RAN WG1 Meeting #62bis, X'ian, China, Oct. 11-15, 2010, R1-10xxxx, pp. 1-85.

TSG-RAN WG1 Meeting #62bism Xi'an, P. R. China, Oct. 11-15, 2010, Agenda Item: 6.8.1.1, "Way Forward on time-domain extension of Rel 8/9 backhaul-based ICIC," R1-105779, pp. 1-4.

"3rd Generation Partnership Project; Technical Specification Group Radio Access Network; Evolved Universal Terrestrial Radio Access (E-UTRA); Physical layer procedures (Release 9)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V9.3.0, Sep. 17, 2010, pp. 1-80, XP050442094, [retrieved on Sep. 17, 2010].

Catt: "Interference Measurement over Muted RE," 3GPP TSG RAN WG1 Meeting #62bis, R1-105164, Oct. 2010, pp. 1-4.

Huawei: "Overhead reduction of UL CQI signalling for E-UTRA DL," 3GPP TSG RAN LTE Ad Hoc, R1-061819, Jun. 2006, pp. 1-9.

Huawei: "Specification of Resource-Specific Measurements," 3GPP TSG RAN WG1 meeting #62bis, R1-105257, Oct. 2010, pp. 1-4.

NTT DOCOMO: "Views on eICIC Schemes for Rel-10," 3GPP TSG RAN WG1 Meeting #62bis, R1-105442, pp. 1-9, Oct. 2010.

NTT DOCOMO: "Views on eICIC Schemes for Rel-10," 3GPP TSG RAN WG1 Meeting #62bis, R1-105724, pp. 1-9, Oct. 2010.

Panosonic: "Discussion on aperiodic feedback of PMI/CQI responding to CSI-RS," 3GPP TSG RAN WG1 Meeting #61bis, R1-103768, Jun. 2010, pp. 1-4.

Translation of First Office Action from counterpart Japanese Application No. 2013-537689, dated May 7, 2014, 6 pages.

www.3gpp.org—/ftp/Specs/archive/36_series/36.213/, [online], [Searched on Apr. 9, 2014], Internet <URL: http://www.3gpp.org/ftp/Specs/archive/36_series/36.213/>.

www.3gpp.org—/ftp/tsg_ran/WG1_RL1/TSGR1_61b/Docs/, [online], [Searched on Apr. 9, 2014], Internet <URL: http://www.3gpp.org/ftp/tsg_ran/WG1_RL1/TSGR1_61b/Docs/>.

www.3gpp.org—/ftp/tsg_ran/wg1_rl1/TSGR1_62b/Docs/, [online], [Searched on Apr. 9, 2014], Internet <URL: http://www.3gpp.org/ftp/tsg_ran/wg1_rl1/TSGR1_62b/Docs/>.

www.3gpp.org—/ftp/tsg_ran/wg1_rl1/TSGR1_AH/LTE_AH_June-06/Docs/, [online], [Searched on Apr. 9, 2014], Internet <URL: http://www.3gpp.org/ftp/tsg_ran/wg1_rl1/TSGR1_AH/LTE_AH_June-06/Docs/>.

Decision on Grant Patent for Invention for Russian Application No. 2013125478, dated Aug. 13, 2014 and English Translation provided by Russian Local Counsel, 10 Pages.

Notice to File a Response for Korean Application No. 10-2013-7014245 dated Apr. 28, 2015, 6 pages.

* cited by examiner

METHOD AND APPARATUS FOR RESTRICTED MEASURING IN A WIRELESS NETWORK

CLAIM OF PRIORITY UNDER 35 U.S.C. §119

The present application for patent claims priority to Provisional Application No. 61/409,069, entitled "RESTRICTED MEASUREMENTS FOR PHYSICAL LAYER PROCEDURES IN A MOBILE NETWORK," filed Nov. 1, 2010, assigned to the assignee hereof and hereby expressly incorporated by reference herein, as well as Provisional Application No. 61/413,861, entitled "RESTRICTED MEASUREMENTS FOR PHYSICAL LAYER PROCEDURES IN A MOBILE NETWORK," filed Nov. 15, 2010, assigned to the assignee hereof and hereby expressly incorporated by reference herein.

BACKGROUND

1. Field

The following description relates generally to wireless network communications, and more particularly to measuring interference from base stations while accounting for inter-cell coordination of resources.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In addition, some wireless networks allow deployment of low power base stations (e.g., femto nodes, pico nodes, micro nodes, etc.), to which a device can connect to receive alternative wireless network access. For example, the low power base station can communicate with the wireless network over a broadband or other backhaul connection (e.g., a digital subscriber line (DSL) connection, T1 connection, cable connection, etc.), while also providing an access link over which devices can communicate therewith to receive access to the wireless network.

For example, low power base stations can be deployed within macrocell base station coverage areas, which can result in multiple levels of interference where the base stations operate in a similar and/or adjacent frequency spectrum, such as interference to devices communicating therewith, interference to the low power base stations and macrocell base station from devices communicating therewith, etc. Resource partitioning schemes, such as enhanced inter-cell interference coordination (eICIC), have been implemented to allow the low power base stations and macrocell base stations to negotiate transmission (and/or reception) radio resources to avoid such interference. In these schemes, a low power base station can schedule device communications in different time periods than the macrocell base station uses to schedule devices. Thus, interference for a given base station can vary over a given set of resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with determining at least one set of communication resources over which to measure signals from a base station. For example, certain communication resources of the base station can be interfered by communications from other base stations, and thus the determined set of communications resources can correspond to at least a portion of resources that are not subject to such interference. The base station can negotiate communication resources with the other base stations, in one example, and can provide an indication of the negotiated resources to facilitate measurement thereover. In another example, the base station can provide an indication of an interfered set of resources to the device for measuring and/or for determining a complementary set of resources over which a level of interference is uncertain. Moreover, in other examples, parameters defining a duty cycle for measuring signals from the base station can be determined by a device or otherwise signaled by the base station.

According to an example, a method for wireless communications is provided that includes receiving signals from a base station over a set of resources and receiving one or more parameters related to a restricted resource pattern (RRP) for measuring signals from the base station over a first portion of resources from the set of resources. The method also includes measuring signals over the first portion of resources based on the one or more parameters to determine one or more signal measurements and performing one or more physical layer procedures based on the one or more signal measurements.

In another aspect, an apparatus for wireless communication is provided. The apparatus includes means for receiving signals from a base station over a set of resources and means for receiving one or more parameters related to a RRP for measuring signals from the base station over a first portion of resources over the set of resources. The apparatus also includes means for measuring signals over the first portion of resources based on the one or more parameters to determine one or more signal measurements and means for performing one or more physical layer procedures based on the one or more signal measurements.

In yet another aspect, an apparatus for wireless communication is provided including at least one processor configured to receive signals from a base station over a set of resources and receive one or more parameters related to a RRP for measuring signals from the base station over a first portion of resources from the set of resources. The at least one processor is further configured to measure signals over the first portion of resources based on the one or more parameters to determine one or more signal measurements and perform one or more physical layer procedures based on the one or more signal measurements. The apparatus further includes a memory coupled to the at least one processor.

Still, in another aspect, a computer-program product for wireless communication is provided including a computer-readable medium having code for causing at least one computer to receive signals from a base station over a set of resources and code for causing the at least one computer to receive one or more parameters related to a RRP for measuring signals from the base station over a first portion of resources from the set of resources. The computer-readable medium further includes code for causing the at least one computer to measure signals over the first portion of resources based on the one or more parameters to determine one or more signal measurements and code for causing the at least one computer to perform one or more physical layer procedures based on the one or more signal measurements.

According to another example, a method of wireless communication is provided that includes determining a RRP for measuring signals transmitted over a set of resources and communicating one or more parameters corresponding to the RRP to a device In another aspect, an apparatus for wireless communication is provided. The apparatus includes means for determining a RRP for measuring signals transmitted over a set of resources. The apparatus also includes means for communicating one or more parameters corresponding to the RRP to a device.

In yet another aspect, an apparatus for wireless communication is provided including at least one processor configured to determine a RRP for measuring signals transmitted over a set of resources. The at least one processor is further configured to communicate one or more parameters corresponding to the RRP to a device. The apparatus further includes a memory coupled to the at least one processor.

Still, in another aspect, a computer-program product for wireless communication is provided including a computer-readable medium having code for causing at least one computer to determine a RRP for measuring signals transmitted over a set of resources. The computer-readable medium further includes code for causing the at least one computer to communicate one or more parameters corresponding to the RRP to a device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
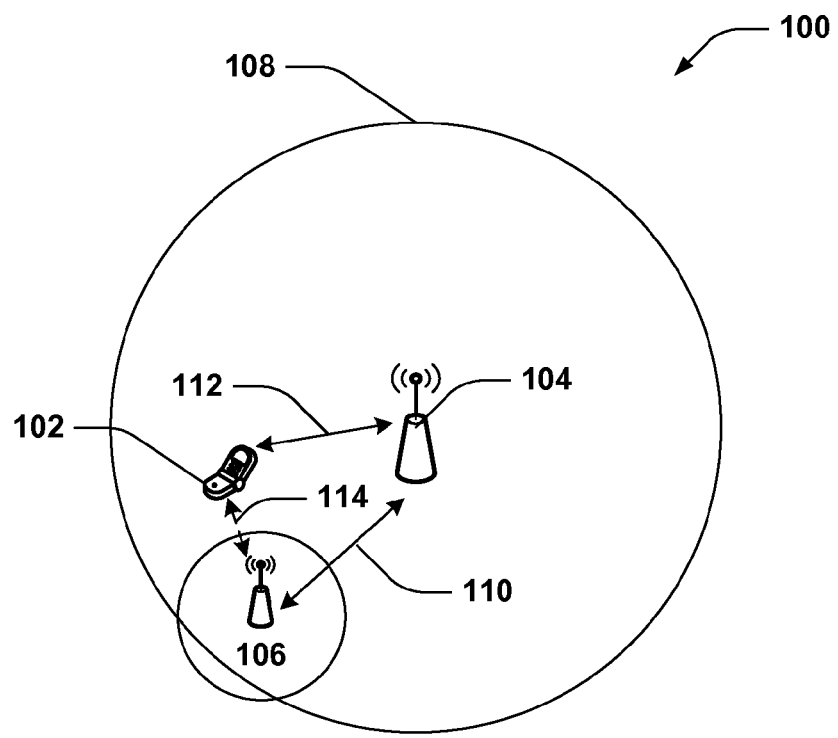
FIG. 1 is a block diagram of an aspect of a system for measuring signals from a base station.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described further herein are various considerations related to a device measuring signals from a base station over a determined set of resources. In one example, the set of resources can be determined as resources that are not subject to interference from one or more other base stations. For example, such resources can be negotiated between the base station and one or more other base stations using a resource partitioning scheme, such as enhanced inter-cell interference cancellation (eICIC), and/or the like. Thus, the base station can indicate at least a portion of the negotiated resources to the device for performing measurements of signals from the base station over the negotiated resources. In this regard, the measurements of the signals can be free from interference by the one or more other base stations.

In another example, the base station can indicate a portion of resources known to have interference from the one or more other base stations (e.g., resources negotiated by the one or more other base stations) to the device. In this example, the device can additionally determine a complementary portion of the resources for which an interference level is unknown, and can determine whether to utilize any of the complementary portion of resources for measuring signals from the base station. In yet another example, duty cycle parameters can be determined by and/or otherwise signaled to the device for indicating resources over which the device can measure signals from the base station. In any case, the measurements performed by the device can be for the purpose of interference averaging, which can be used by one or more radio link monitoring (RLM) procedures (e.g., radio link failure (RLF)), one or more radio resource management (RRM) functions (e.g., neighbor cell measurements for reselection), one or more channel state information (CSI) feedback operations (e.g., channel quality indicator (CQI) reporting), and/or the like.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an example system 100 for measuring signals from base stations. System 100 can include a device 102 that can communicate with base station 104 within a cell 108 provided by the base station 104 to access a wireless network. System 100 also includes a base station 106 that provides wireless network access at least partially within cell 108. For example, device 102 can be a UE, modem (or other tethered device), a portion thereof, and/or the like. Base stations 104 and 106 can each be macrocell base station, femto node, pico node, micro node, or similar base station, a mobile base station, a relay node, a UE (e.g., communicating in peer-to-peer mode with device 102), a portion thereof, and/or the like. In one example, base station 106 can be a femto node or similar base station deployed in cell 108 provided by base station 104, which may include a macrocell base station. Thus, base station 106—and/or devices communicating therewith—can cause interference to base station 104 and/or device 102, and/or vice versa. In this regard, for example, base stations 104 and 106 can coordinate protected resources (e.g., over a backhaul connection 110) over which the base stations can separately communicate without interfering with each other. For example, the protected resources can be negotiated using one or more resource partitioning schemes, such as eICIC. The resource partitioning can be based on time division multiplexing (TDM), frequency division multiplexing (FDM), spatial division multiplexing (SDM), orthogonal frequency division multiplexing (OFDM), and/or the like.

According to an example, device 102 can communicate with base station 104 to receive wireless network access and can perform physical layer procedures involving measuring base station 104 and/or other base stations. For example, such procedures can include RLM procedures, such as detecting RLF, RRM functions, such as measuring cells for active mode hand-in or reselection, CSI operations, such as measuring CQI or other quality measurements for reporting to base station 104, and/or the like. In this example, device 102 can accordingly periodically measure signals 112 in the serving cell 108 as well as signals 114 from one or more neighboring cells to determine an average signal quality or an average interference. For example, the measurements can comprise signal-to-noise ratio (SNR), carrier-to-interference-and-noise ratio (CINR), received signal strength indicator (RSSI), reference signal received power (RSRP), reference signal received quality (RSRQ), and/or similar measurements.

Since signals from base station 104 can be interfered by signals from base station 106 as received at the device 102, however, device 102 can determine a set of resources over which to measure signals from base station 104 to avoid interference from base station 106 and/or other base stations.

In one example, device 102 can receive an indication of a set of resources over which to measure signals from base station 104. For example, the indication can correspond to a bitmap that specifies whether each of a plurality of resources (e.g., subframes) can be measured by the device 102. In one example, the device can receive the bitmap from the base station 104 upon initializing communications therewith (e.g., in an RRC message), based on requesting such information from base station 104, and/or the like. Base station 104 can generate the bitmap to correspond to protected resources negotiated with one or more base stations, such as base station 106; thus, the bitmap can specify at least a portion of the protected resources for measuring by device 102. The bitmap can correspond to a fixed or variable number of resources and can be repetitively used to determine subsequent resources for measuring.

In another example, base station 104 can also communicate an indication of a set of resources that are interfered by one or more base stations, such as base station 106, to device 102. Device 102 can determine a complementary set of resources based on the set of resources over which to measure signals from base station 104 (e.g., a set of resources with little or no interference) and the set of resources that are interfered by one or more base stations. The complementary set can correspond to resources over which a level of interference is not known by base station 104. Thus, in an example, the device can further utilize the complementary set in measuring the base station 104. This can include performing measurements over resources in the complementary set, not performing measurements over resources in the complementary set, performing measurements over certain resources in the complementary set (e.g., according to a duty cycle, according to resource groupings relating to retransmission, based on a blind interference detection of signals over the complementary set of resources, etc.), and/or the like.

In yet another example, device 102 can define a duty cycle and/or a number of subframes over which to measure signals from base station 104. For example, the duty cycle and/or subframe parameters can be received from base station 104 or other network component and/or can be determined based on one or more configured or hardcoded parameters, a history of previous parameters, and/or the like. For example, a duty cycle can correspond to a period of time (e.g., a number of subframes) between measurements of signals from base station 104, and the number of subframes can be a maximum number of subframes over which to receive signals for measuring within the duty cycle. In an example, a time period for the duty cycle can be based in part on a retransmission time period. In any case, the device 102 can perform measurements at least over partitioned resources to mitigate considering interfered resources for the purposes of one or more physical layer procedures.

Figure 2:
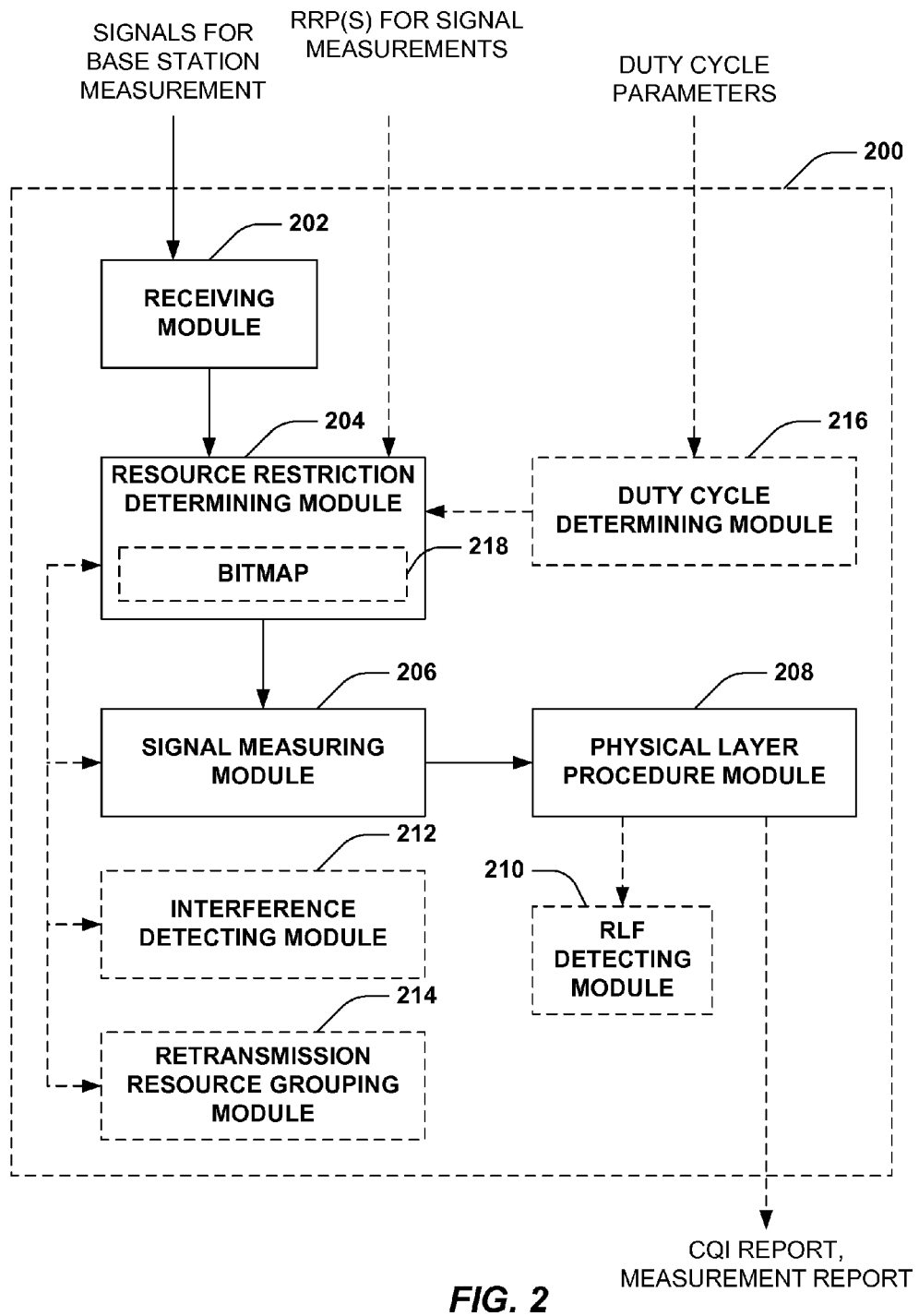
FIG. 2 is a block diagram of an aspect of a system for determining resources over which to measure signals from a base station.

FIG. 2 illustrates an example apparatus 200 for determining resources over which to measure signals from one or more base stations. In this illustration, dashed lines can refer to optional modules and/or communications therewith. Apparatus 200 can be a device, such as device 102, that communicates with one or more base stations in a wireless network to receive access thereto, and can include additional modules than those depicted to facilitate such communicating. Apparatus 200 can include a receiving module 202 for receiving signals transmitted by one or more base stations, a resource restriction determining module 204 for determining one or more resources over which to measure the signals, a signal measuring module 206 for performing measurement of the signals, and/or a physical layer procedure module 208 for executing one or more physical layer procedures based in part on the signal measurements. Apparatus 200 can also optionally include a RLF detecting module 210 for determining RLF based on one or more measurements, an interference detecting module 212 for attempting to determine a level of interference of signals received from the base station over one or more resources, a retransmission resource grouping module 214 for obtaining a grouping of resources that may have similar interference characteristics based on a retransmission scheme, and/or a duty cycle determining module 216 for providing one or more duty cycle parameters for determining resources over which to measure signals from a base station.

According to an example, receiving module 202 can obtain signals for base station measurement. For example, the signals can be received from the base station (not shown) and can correspond to one or more pilot signals or other signals transmitted by the base station. The signals transmitted by the base station can be interfered over some resources, and resource restriction determining module 204 can accordingly determine a set of resources over which to obtain signal measurements. In one example, resource restriction determining module 204 can obtain one or more resource restriction patterns (RRP) for signal measurements. Resource restriction determining module 204, in this example, can receive the RRP(s) from the base station or one or more other network components. The RRP(s) can comprise one or more bitmaps 218 where each bit can represent whether signals are to be measured over a corresponding subframe. Moreover, the RRP(s) can be received from the base station in a RRC message, such as an RRCConnectionReconfiguration message for establishing a radio bearer with the base stations.

In this example, signal measuring module 206 can measure the signals from the base station over the resources indicated in the RRP bitmap 218. For example, the bitmap 218 can indicate measurement assignments over protected resources negotiated by the base station using a resource partitioning scheme (e.g., eICIC). Thus, measurements performed over the protected resources indicated in the RRP bitmap 218 can be substantially free of interference from one or more other base stations. In addition, the RRP bitmap 218 can be of substantially any length and can correspond to a number of previously received subframes either explicitly (e.g., based on a subframe number (SFN)), beginning with a current subframe, etc. For example, each bit in the bitmap 218 can represent a portion of a time period for a retransmission scheme, such as hybrid automatic repeat/request (HARQ), a portion of a time period of a communication frame, a lowest common multiple thereof or other function, and/or the like. In a specific LTE example using frequency division duplexing (FDD), where a HARQ retransmission time period is 8 milliseconds (ms), and a communication frame is 10 ms, the bitmap 218 can be 40 ms (the lowest common multiple of 8 ms and 10 ms), where each bit represents 1 ms (e.g., one explicit subframe in LTE). Signal measuring module 206 can measure signals received over a portion of the previous 40 subframes, as indicated in the RRP.

For example, resource restriction determining module 204 can receive a RRP bitmap 218 similar to the following:
  1000000010 0000001000 0000100000 0010000000

The above bitmap 218, for example, is 40 bits and can specify to measure in a current subframe (based on the first bit), as well as subframes at 8, 16, 24, and 32 subframes from the current subframe. This can correlate to a HARQ retransmission scheme in LTE, and thus the current subframe and subframes that are multiples of 8 ms away can have the same or similar interference. In this regard, the bitmap 218 represents groups of subframes that are 8 ms apart as having similar interference in FDD. In other examples, such as time division duplexing (TDD), grouping may be more complicated since the retransmission time period can be variable. Thus the bitmap 218 in TDD configurations can be fixed, variable to match the retransmission time period (e.g., based on a lowest common multiple with the communication frame time period or otherwise), etc. As described further herein, for TDD subframes can be grouped based on determining subframes of similar interference, which can include uplink HARQ subframes used for communicating HARQ indicators for associated downlink subframes, as well as subframes during which retransmission occurs for the downlink subframes, and/or the like.

The bitmap 218 can be similar to a measSubframePattern in LTE, which can be used to specify time domain measurement resource restriction. In this example, the first/leftmost bit corresponds to the subframe #0 of the radio frame satisfying SFN mod x=0, where SFN is that of a primary cell, PCell, and x is the size of the bit string divided by 10. Also, in this example, "1" can denote that the corresponding subframe is used for measurement.

Thus, signal measuring module 206 can measure signals from the base station over resources indicated in the RRP bitmap 218 (e.g., resources with a corresponding bit set to one). For example, in LTE, this can be based on at least one of associating the bits in the bitmap 218 with explicit SFNs of subframes over which signals are received from the base station, using a sliding measurement window to associate the bits with the subframes based on a current subframe, and/or the like. Signal measuring module 206 can then measure signals over the subframes based on whether a given bit indicates measurement. In an example, signal measuring module 206 can generate an interference average over the resources based on the signal measurements.

Physical layer procedure module 208 can perform one or more physical layer procedures using the signal measurements and/or interference average, such as an RLM procedure, RRM function, a CSI operation, and/or the like. For example, an RLM procedure can include RLF detecting module 210 attempting to detect RLF based on the measurements of the base station (e.g., where an average measurement over the protected resources is below a threshold level). In another example, physical layer procedure module 208 can generate a CQI report, measurement report, etc. using the measurements and/or an average thereof. Because measurements without interference are utilized in this regard, the physical layer procedures can produce more accurate results with respect to the base station.

In another example, resources that are not specified for measurement in the RRP bitmap 218 can correspond to resources over which presence and/or level of interference is not known by the base station. In one example, signal measuring module 206 can ignore measurements received over such resources for determining measurements of the base station. In another example, however, signal measuring module 206 can additionally measure signals received over at least a portion of these resources. For example, signal measuring module 206 can average signal measurements over all resources not specified for measurement in the RRP, or over at least a portion of such resources according to one or more duty cycle parameters. For example, the duty cycle parameters can be received or generated by duty cycle determining module 216 to include a duty cycle T related to a period for measuring signals and/or a maximum number of subframes N over which signals can be measured in the given duty cycle T, as described further herein. Moreover, the duty cycle parameters can include an offset for utilizing the duty cycle. In either case, for example, signal measuring module 206 can utilize a portion of the measurements along with those measurements over the resources indicated in the RRP bitmap 218, separately provide at least the portion of the measurements over the resources not specified for measurement to the physical layer procedure module 208, and/or the like.

Thus, for example, physical layer procedure module 208 can perform physical layer procedures separately for the resources not specified for measurement. For example, physical layer procedure module 208 can report CQI for the resources indicated in the RRP bitmap 218, and separately report CQI for the resources not specified for measurement in the bitmap 218.

In another example, interference detecting module 212 can attempt to determine a level of interference over the resources not specified for measurement in the RRP bitmap 218. For instance, interference detecting module 212 can perform interference estimation over one or more of the resources to determine resources having a low level of interference (e.g., satisfying a threshold). In this example, signal measuring module 206 can provide signal measurements over the resources to physical layer procedure module 208 as well and/or can indicate the resources to resource restriction determining module 204, which can update the bitmap 218 to include the resources (e.g., for a measurement in a subsequent time period of the bitmap 218). Similarly, interference detecting module 212 can determine one or more of the resources having a high level of interference (e.g., satisfying a threshold), and can separately provide such measurements to physical layer procedure module 208 for separate reporting, and/or resource restriction determining module 204 can indicate the resources in a separate bitmap corresponding to interfered resources, as described further herein.

For example, interference detecting module 212 can perform blind interference detection over the resources not specified for measurement in the RRP bitmap 218 (e.g., resources having a corresponding bit set to zero). If an interference measurement is similar to a level of interference over a resource indicated for measurement in the bitmap 218, for example, interference detecting module 212 can determine that the resource over which the blind interference detection is performed can be measured. In another example, interference detecting module 212 can determine one or more resources corresponding to cross-subframe scheduling assignments (e.g., subframes indicated for transmitting paging signals, system information blocks (SIB), such as SIB1, and/or the like). Since such subframes typically have low interference (e.g., due to resource partitioning or otherwise known reservation for communicating such signals), interference detecting module 212 can additionally determine that signals can be measured over such subframes. Where additional resources are so determined for measurement, interference detecting module 212 can notify resource restriction determining module 204 to accordingly modify the bitmap 218 to include such resources and/or can indicate such to signal measuring module 206 to allow measuring over the resources.

Figure 4:
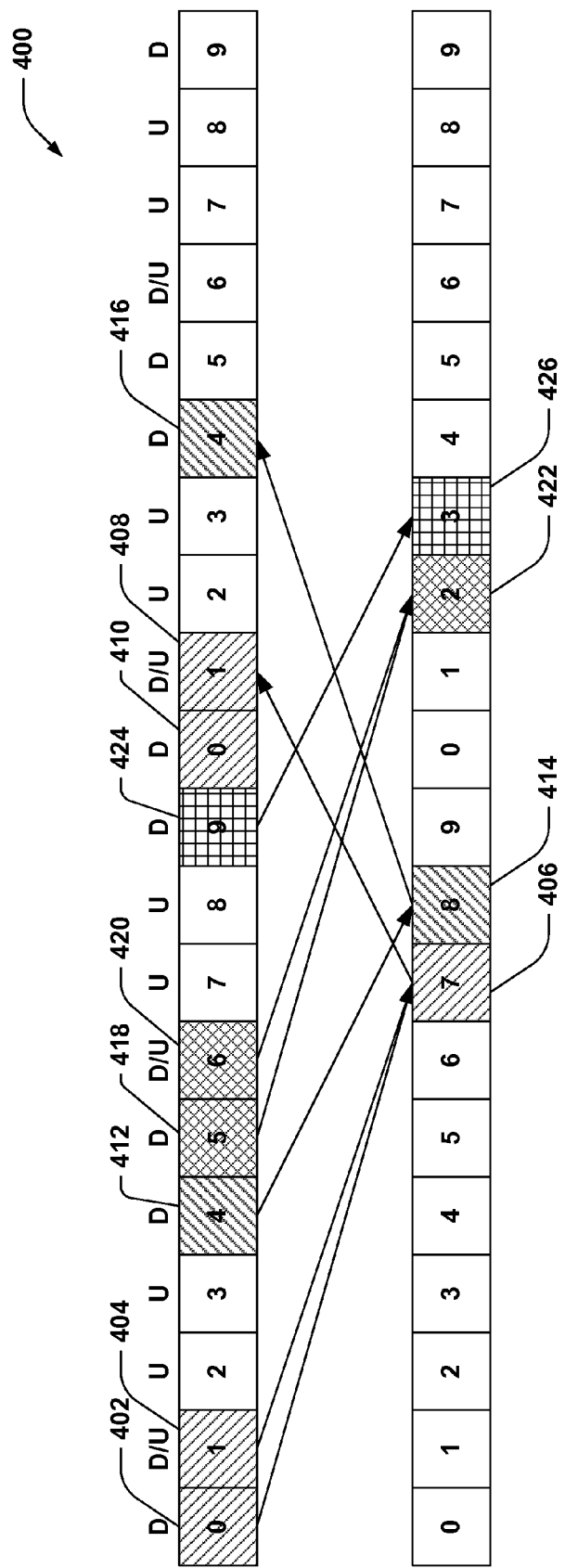
FIG. 4 is a block diagram of example TDD subframe configurations.

In another example, retransmission resource grouping module 214 can generate or otherwise receive groupings of resources (e.g., subframes) for the purpose of retransmission. Resource restriction determining module 204 can provide the RRP bitmap 218 to retransmission resource grouping module 214, which can determine whether additional resources can be utilized for measuring signals from the base station based on the retransmission resource grouping. For example, for a given subframe in LTE, retransmission resource grouping module 214 can associate the subframe with other subframes in a communication frame based on a subframe over which HARQ acknowledgement indicators for communications in the subframe occur and/or based on other subframes having a similar assigned HARQ retransmission subframe, as described further below. For example, a similar level of interference can be expected over the grouping of subframes at least since the subframes can have similar resource partitioning to allow for reliable operation of the retransmission scheme. Thus, for a subframe indicated for measurement in the RRP bitmap 218, retransmission resource grouping module 214 can indicate or otherwise update the bitmap 218 with related subframes in a grouping with the subframe for additional measuring in a current or subsequent time period. Such grouping can be applied in TDD configurations, one possible example of which is illustrated in FIG. 4. In another example, retransmission resource grouping module 214 can notify signal measuring module 206 of the similar subframes for current signal measurements.

In another example, resource restriction determining module 204 can obtain another bitmap 218 from the base station that indicates a set of interfered resources. For example, the base station can indicate, in the bitmap 218, resources negotiated for utilization by other base stations. In another example, the base station can determine the resources based on CQI reported from apparatus 200 and/or other devices. In any case, signal measuring module 206 can determine to refrain from measuring signals received over the resources. Additionally, in this example, there can be a complementary set of resources that are not indicated in either bitmap 218 (e.g., the bitmap of interfered resources or the bitmap corresponding to the RRP), and thus interference is not known for the set of complementary resources. In this example, similar concepts (e.g., blind detection, etc., as described above) can be applied to determine at least one of whether to allow signal measuring module 206 to measure signals over at least a portion of the set of complementary resources, whether to cause resource restriction determining module 204 to update bitmap 218 to indicate measurement over at least the portion of the set of complementary resources, and/or the like.

In other examples, resource restriction determining module 204 can determine resources over which to measure signals from a base station based on one or more duty cycle parameters. For example, duty cycle determining module 216 can generate or otherwise receive the one or more parameters, which can include duty cycle T, maximum number of subframes N, and/or the like. Duty cycle determining module 216, in one example, can generate at least one of the parameters based on a configuration, a historical analysis of the parameter (e.g., which parameters produce the most accurate measurements), and/or the like. In another example, duty cycle determining module 216 can determine the parameters from a hardcoding or receive the parameters from the base station or other network components, etc. In either case, resource restriction determining module 204 can select one or more subframes in a duty cycle T of subframes based on the maximum number N of subframes, and signal measuring module 206 can measure signals received over the subframes. In one specific example, T can be 1 and N can be 2 to facilitate measuring consecutive subframes. In other examples, additional duty cycles can be specified by duty cycle determining module 216. In one example, the duty cycles can include $T_1$ and $T_2$, with maximum number of subframes $N_1$ and $N_2$. Thus, resource restriction determining module 204, in one example, can select subframes n (a current subframe), $n-T_1, \ldots, n-(N_1-1)T_1, n-T_2, n-T_2-T_1, \ldots, n-iT_1-jT_2$ for $i<N_1$ and $j<N_2$, for measuring.

Further, for example, the RRP bitmap 218 can be generated by the base station to be specific to a given device, such as apparatus 200. Apparatus 200 can be subject to potential interference from one or more base stations to which other devices communicating with the base station may or may not be subject. Thus, the RRP bitmap 218 can relate to at least a location of apparatus 200 relative to the base station.

Figure 3:
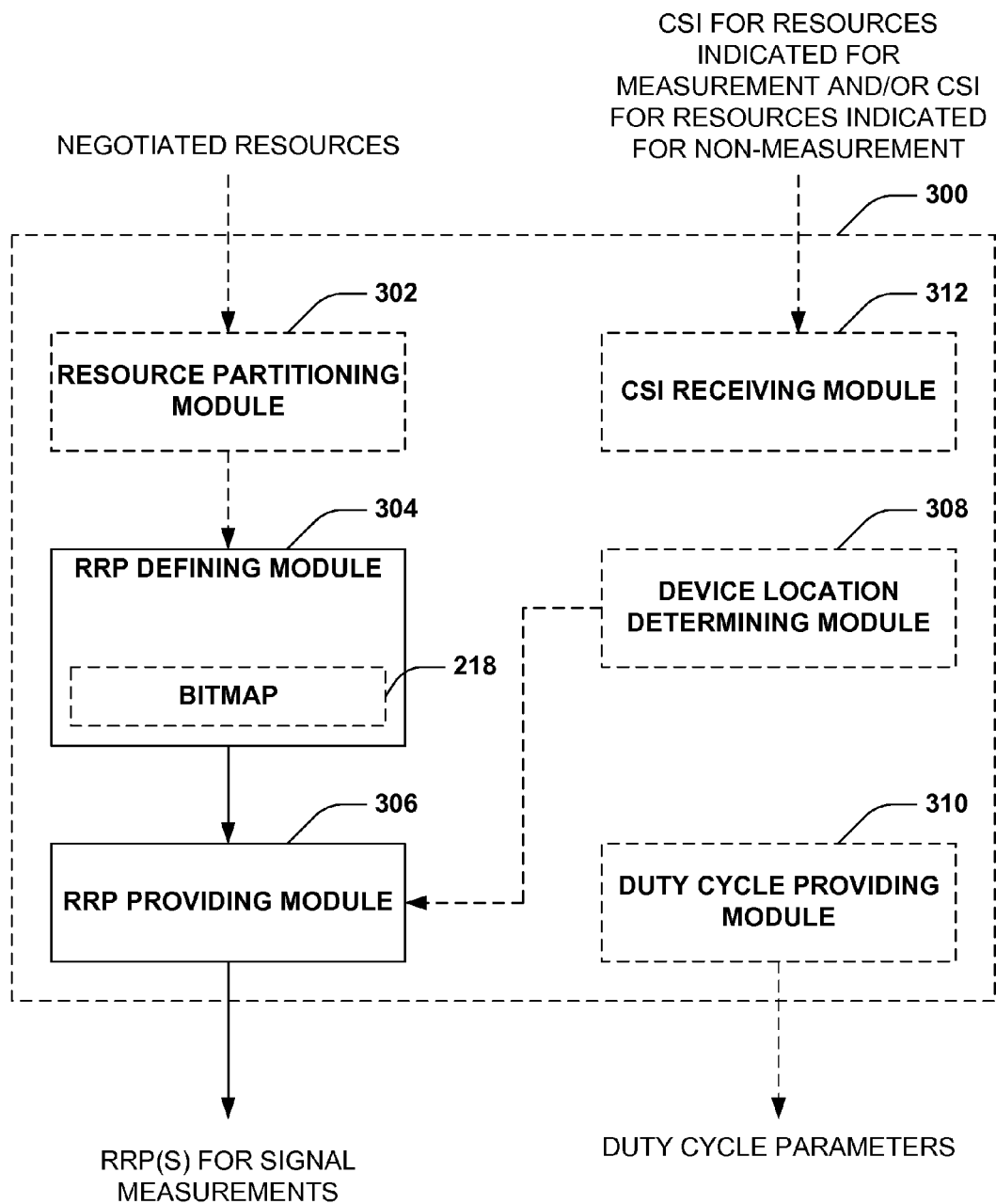
FIG. 3 is a block diagram of an aspect of a system for providing a resource restriction pattern (RRP) to one or more devices.

FIG. 3 illustrates an example apparatus 300 for providing a RRP for measuring signals transmitted by the apparatus 300. In this illustration, dashed lines can refer to optional modules and/or communications therewith. Apparatus 300 can be a femto node, macrocell base station, or other base stations (e.g., base stations 104 and 106), that can communicate with devices in a wireless network to provide access thereto. Apparatus 300 can include an optional resource partitioning module 302 for negotiating or otherwise receiving an indication of protected resources over which apparatus 300 can transmit without interference from one or more other base stations, a RRP defining module 304 for generating a RRP based in part on the protected resources, and a RRP providing module 306 for communicating the RRP to one or more devices. Apparatus 300 can also optionally include a device location determining module 308 for obtaining a location of a device, a duty cycle providing module 310 for generating and/or providing one or more duty cycle parameters for measuring signals transmitted by apparatus 300, and/or a CSI receiving module 312 for obtaining CSI related to signals received over a set of resources.

According to an example, resource partitioning module 302 can obtain an indication of negotiated protected resources based on a resource partitioning scheme performed with one or more base stations (e.g., eICIC). In one example, resource partitioning module 302 can negotiate different resources with different base stations based on availability, location of the different base stations, and/or the like. RRP defining module 304 can generate a RRP for measuring signals from apparatus 300, which can be in the form of bitmap 218. For example, RRP defining module 304 can generate RRP bitmap 218 to specify whether resources related to each bit should be measured (e.g., whether the resources correspond to protected resources that should be free from interference).

In LTE, for example, the bitmap 218 can be 40 bits, where each bit corresponds to a 1 ms subframe. Starting at a current or otherwise explicitly identified subframe, the bitmap 218 can indicate whether signals received over a subframe a number of ms away from the current subframe should be measured for the purposes of one or more physical layer procedures at a device. For example, this can include reporting CSI and/or measurement reports back to apparatus 300, and in one example, CSI receiving module 312 can obtain the CSI. Since provided resources should be free from interference, however, more accurate CSI and/or measurement reports can be received from the device. In any case, RRP providing module 306 can communicate the RRP bitmap 218 to one or more devices for measuring signals transmitted by apparatus 300.

In another example, RRP defining module 304 can generate a bitmap 218 of interfered resources. For example, the bitmap 218 of interfered resources can also be based on resource partitioning module 302 indicating one or more resources negotiated by one or more base stations (e.g., resources over which the one or more base stations can transmit signals with minimal interference from apparatus 300). Thus, RRP providing module 306 can additionally provide this bitmap 218 to the one or more devices, which can allow the one or more devices to distinguish between resources for measuring signals from the apparatus from resources over which to avoid such signal measurement. In addition, the device can determine a complementary set of resources for further determining whether to measure. In either case, the device can also measure over interfered resources and/or the complementary set, and provide separate CSI therefor; thus, CSI receiving module 312 can receive CSI as indicated for the interfered resources as well.

Moreover, since the RRP bitmap 218 can be defined for different base stations (e.g., based on resources negotiated with the different base stations), RRP providing module 306 can select and provide a RRP bitmap 218 to a device based on location of the device. For example, device location determining module 308 can determine a location of a device (at least relative to apparatus 300 and/or other base stations), and can provide the location information to RRP providing module 306 for determining a bitmap 218 that corresponds to potential interference at the device based in part on the location. In one example, device location determining module 308 can determine that the device is near one or more base stations based on a measurement report received from the device, and can provide information regarding the one or more base stations to RRP providing module 306. In this example, RRP providing module 306 can select and provide to the device a bitmap 218 that indicates resources negotiated with the one or more base stations as resources for measuring signals from apparatus 300. In other examples, device location determining module 308 can determine the location of the device based on one or more other received parameters (e.g., a GPS location, known location of the one or more base stations, etc.) and can select a bitmap 218 related to one or more base stations nearest to the device that can potentially cause interference thereto when receiving signals from apparatus 300.

In yet another example, duty cycle providing module 310 can provide one or more duty cycle parameters to the device, such as a duty cycle T, a maximum number of subframes N, and/or the like. For example, duty cycle providing module 310 can determine the parameters based on a configuration, hardcoding, a utilized retransmission scheme or frame timing, and/or the like.

FIG. 4 is a diagram illustrating an example TDD resource assignment 400 in LTE for which subframes can be grouped in determining or modifying a RRP. In this example, each TDD subframe can be utilized for transmitting downlink data, receiving uplink data, or switching between downlink and uplink in a special subframe (as indicated respectively by D, U, and D/U). Each downlink subframe is mapped to an uplink subframe for transmitting HARQ feedback relating to the downlink subframe. In LTE, subframes for HARQ feedback are at least 4 ms from the related downlink subframe. Thus, in this example, downlink subframe 0 402 and downlink/uplink subframe 1 404 can be mapped to uplink subframe 7 406 for transmitting HARQ feedback related to subframe 0 402 and subframe 1 404. In addition, subframe 7 406 can be associated to downlink/uplink subframe 1 408 in a subsequent frame for retransmitting data from subframe 0 402 and/or subframe 1 404. Thus, subframe 0 402, subframe 1 404, subframe 7 406 and/or subsequent similar subframes, such as subframe 0 410 and subframe 1 408, can be grouped for the purposes of retransmission. In this example, the subframes in the same group can experience similar interference by virtue of resource partitioning. It is to be appreciated, that the depicted configuration is but one possible example. Different TDD configurations can be similarly utilized according to different HARQ timelines, and grouping between downlink subframes and corresponding uplink subframes can accordingly be varied to obtain sets of subframes that experience similar or same interference (e.g., resources assigned for acknowledging communications over the downlink subframes and/or additional downlink subframes assigned for retransmitting the communications for which receipt is negatively acknowledged).

Thus, in this example, downlink subframe 4 412 can be grouped with uplink subframe 8 414 and/or downlink subframe 4 416, downlink subframe 5 418 and downlink/uplink subframe 6 420 can be grouped along with uplink subframe 2 422, and downlink subframe 9 424 can be grouped with uplink subframe 3 426. Thus, where a RRP bitmap indicates that signals received from a base station can be measured over a certain subframe, additional subframes can be used in the measurement where grouped with the certain subframe in a TDD configuration since subframes are reserved for either uplink communication, downlink communication, or U/D switching. In the example above, where the bitmap indicates to measure a current subframe, and previous subframes at 8 ms, 16 ms, 24 ms, and 32 ms in a 40 ms bitmap, where the current subframe is zero, for example, signals over subframes at 1 ms, 7 ms, 9 ms, 15 ms, 17 ms, 23 ms, 25 ms, 31 ms, 33 ms, and/or 39 ms can also be measured (e.g., based on the grouping of subframes 0, 1, and 7). Moreover, the bitmap can be modified to include such measurements in a current or subsequent time period.

Figure 5:
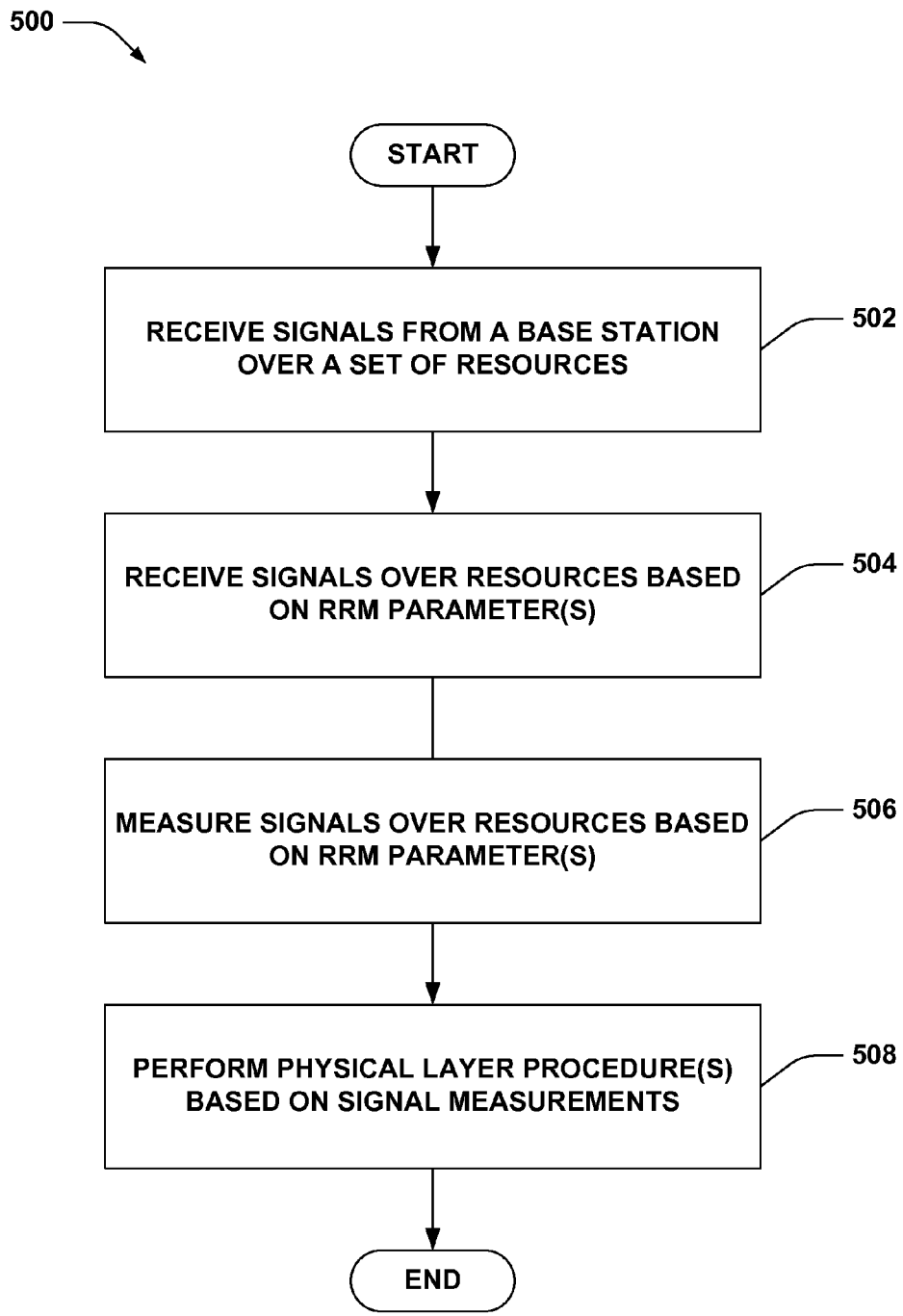
FIG. 5 is a flow chart of an aspect of a methodology for determining resources over which to measure signals from a base station.
Figure 6:
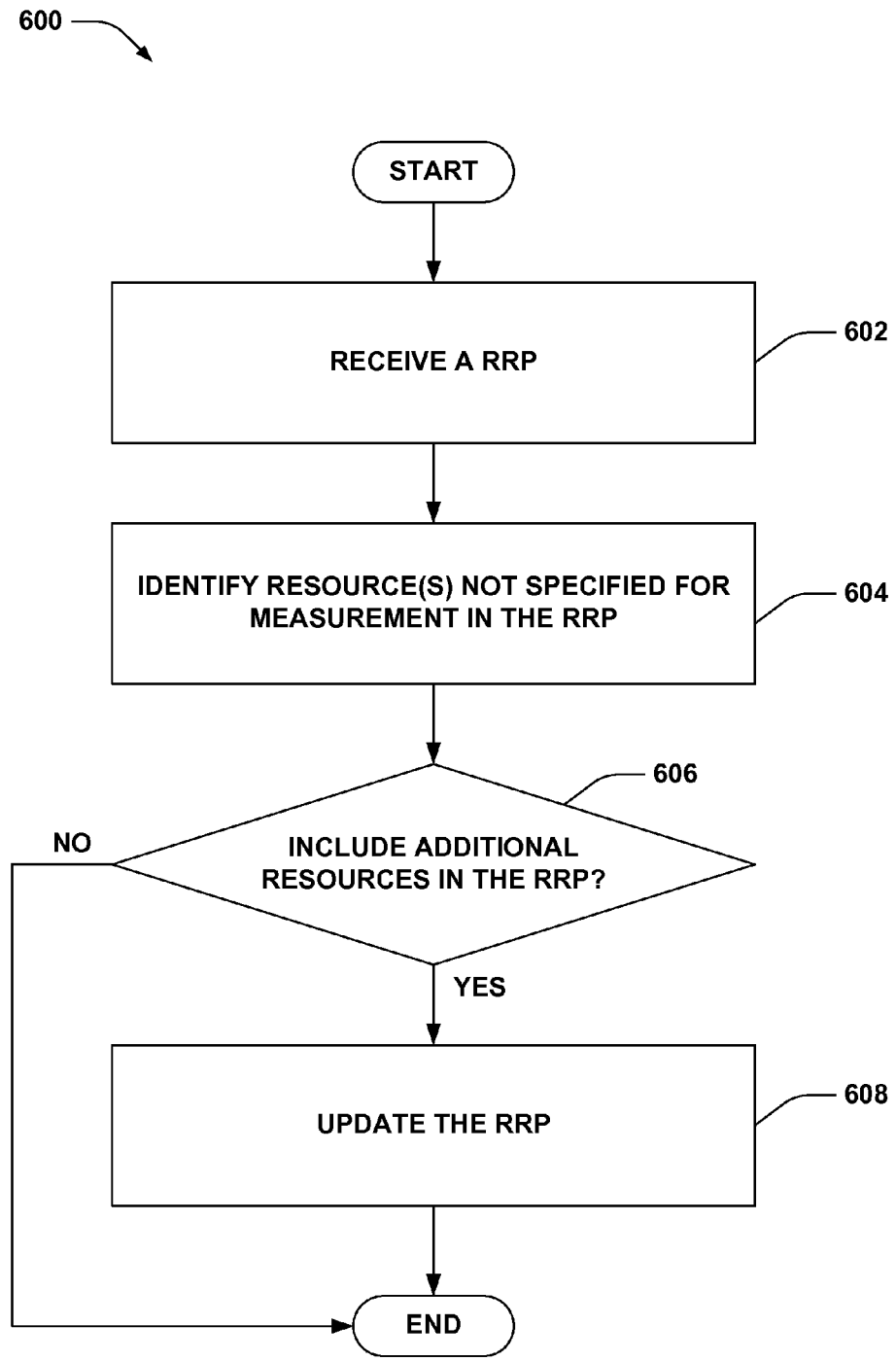
FIG. 6 is a flow chart of an aspect of a methodology for updating a RRP.
Figure 7:
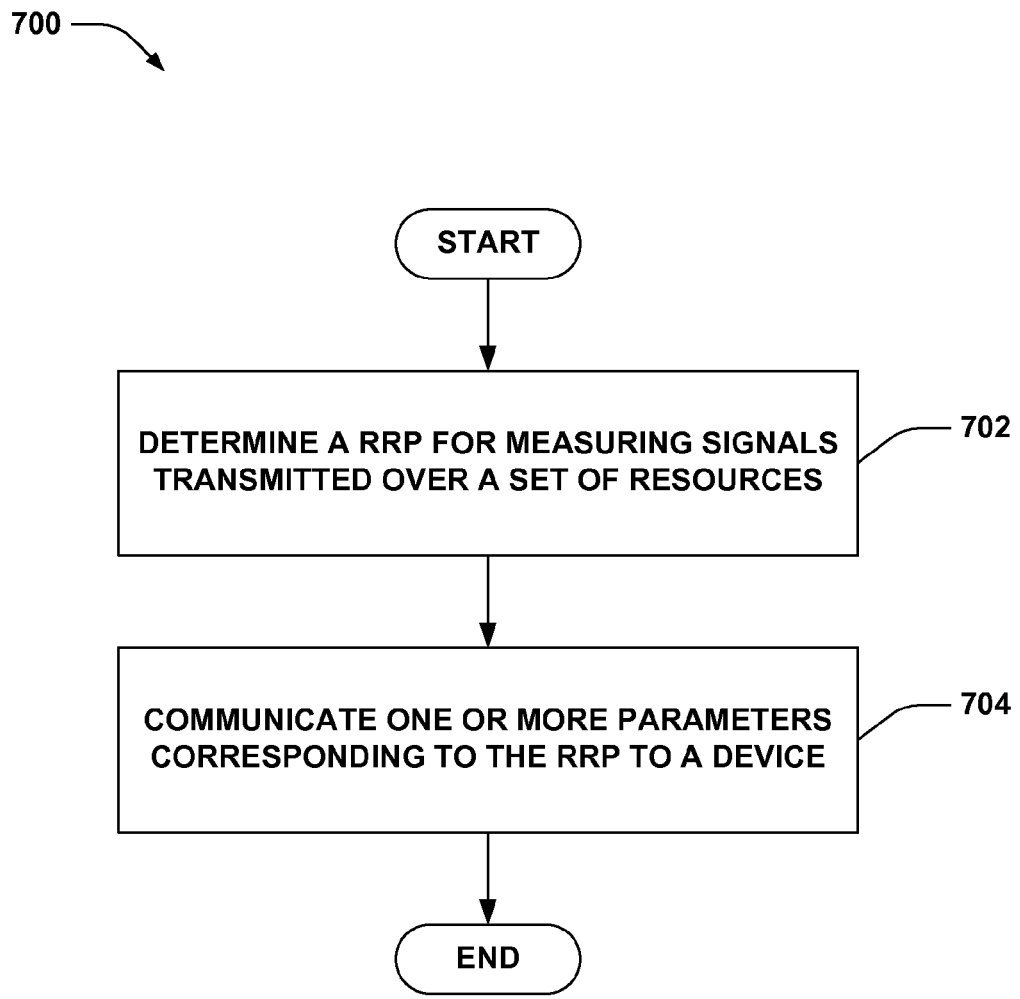
FIG. 7 is a flow chart of an aspect of a methodology for providing a RRP to one or more devices.

FIGS. 5-7 illustrate example methodologies relating to measuring signals from a base station received over various resources. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 5 depicts an example methodology 500 for determining signal measurements for performing one or more physical layer procedures.

At 502, signals can be received from a base station over a set of resources. For example, the signals can correspond to pilot signals, data signals, or other signal transmitted by the base station, and can be received over an operating frequency of the base station using a transceiver.

At 504, signals can be received over the resources based on RRM parameter(s). For example, this can include receiving one or more parameters related to a RRP for measuring signals from the base station over a portion of the set of resources can be received. The one or more parameters can include a RRP bitmap (e.g., received from a base station over RRC signaling) that specifies which of the set of resources can be used to compute signal measurements of the base station. Each bit in the bitmap can correspond to a subframe, in one example, starting with a current subframe and including a plurality of prior subframes where a bit set to one can indicate that signals in the subframe can be measured, while a bit set to zero can indicate to not measure signals over the corresponding subframe. In addition, the resources indicated for measuring in the RRP can correspond to protected resources negotiated by the base station with one or more other base stations. In yet another example, the one or more parameters can correspond to duty cycle parameters, such as a duty cycle time period, a number of subframes over which signals can be measured in the duty cycle, and/or the like.

At 506, signals can be measured over the resources based on the RRM parameter(s). For example, this can include measuring at least a portion of the set of resources based on the one or more parameters to determine one or more signal measurements. Measuring the signals can include determining a SNR, CINR, RSSI, RSRP, RSRQ, or similar metric of the signals received over the portion of the set of resources. The portion of the set of resources can exclude at least part of the set of resources, in one example. Since the portion of resources can be related to a RRP specified by the base station, the measurements over the portion of resources can be more accurate than measuring signals over other resources that may be subject to interference from other base stations.

At 508, physical layer procedure(s) can be performed based on the signal measurements. The physical layer procedure(s) can include RLM procedures, RRM functions, CSI operations, and/or the like, that can use signal measurements to detect RLF, generate measurement reports, report CSI feedback, etc. In another example, a second portion of the resources, outside of the portion of the set of resources, can be separately measured at 506, and additional physical layer procedures can be performed based on measurements of the second portion of the resources at 508. For example, separate CSI can be reported for the portion of the set of resources and the second portion of resources.

FIG. 6 depicts an example methodology 600 for measuring signals received from a base station over a set of resources.

At 602, a RRP can be received. For example, the RRP can be received from a base station for measuring signals therefrom. For example, this can include receiving a RRP bitmap from the base station (e.g., in RRC signaling). In another example, this can include receiving duty cycle parameters from the base station.

At 604, resource(s) not specified for measurement in the RRP can be identified. This can include determining the resources for which the RRP bitmap specifies not to measure (e.g., resources for which a corresponding bit is set to zero in the bitmap) and/or a portion thereof. In another example, an interference bitmap specifying resources that are utilized by one or more other base stations can be received, and a complementary set of resources can be determined as at least the portion of the resources not specified for measurement based on the RRP bitmap and the interference bitmap.

At 606, it can be determined whether to include additional resources in the RRP. In an example, this can include attempting to determine interference over the resources not specified for measurement (e.g., whether signals over the one or more resources satisfy a threshold interference). In another example, this can include determining whether the resources are associated to resources in the RRP according to a grouping (e.g., a grouping of resources for a retransmission scheme). In yet another example, this can include determining the resources correspond to a cross-subframe scheduling assignment. In still another example, this can include determining the resources based on one or more duty cycle parameters.

If it is determined to include additional resources in the RRP, at 608, the RRP can be updated. In an example, this can include updating the RRP bitmap to indicate measuring over the one or more of the at least the portion of the resources for a subsequent or current time period. In another example, this can include updating an interference bitmap to indicate interference over the one or more of the at least the portion of resources for a subsequent or current time period.

FIG. 7 shows an example methodology 700 for providing a RRP to a device.

At 702, a RRP for measuring signals transmitted over a set of resources can be determined. For example, this can include obtaining the RRP from a hardcoding or configuration, determining the RRP based on protected resources negotiated with one or more other base stations using resource partitioning, etc.

At 704, one or more parameters corresponding to the RRP can be communicated to a device. This can include communicating a RRP bitmap to the device, communicating an interference bitmap to the device, and/or the like. Additionally or alternatively, this can include communicating one or more duty cycle parameters to the device.

It will be appreciated that, in accordance with one or more aspects described herein, inferences can be made regarding determining resources over which to measure signals transmitted by a base station, updating a RRP, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
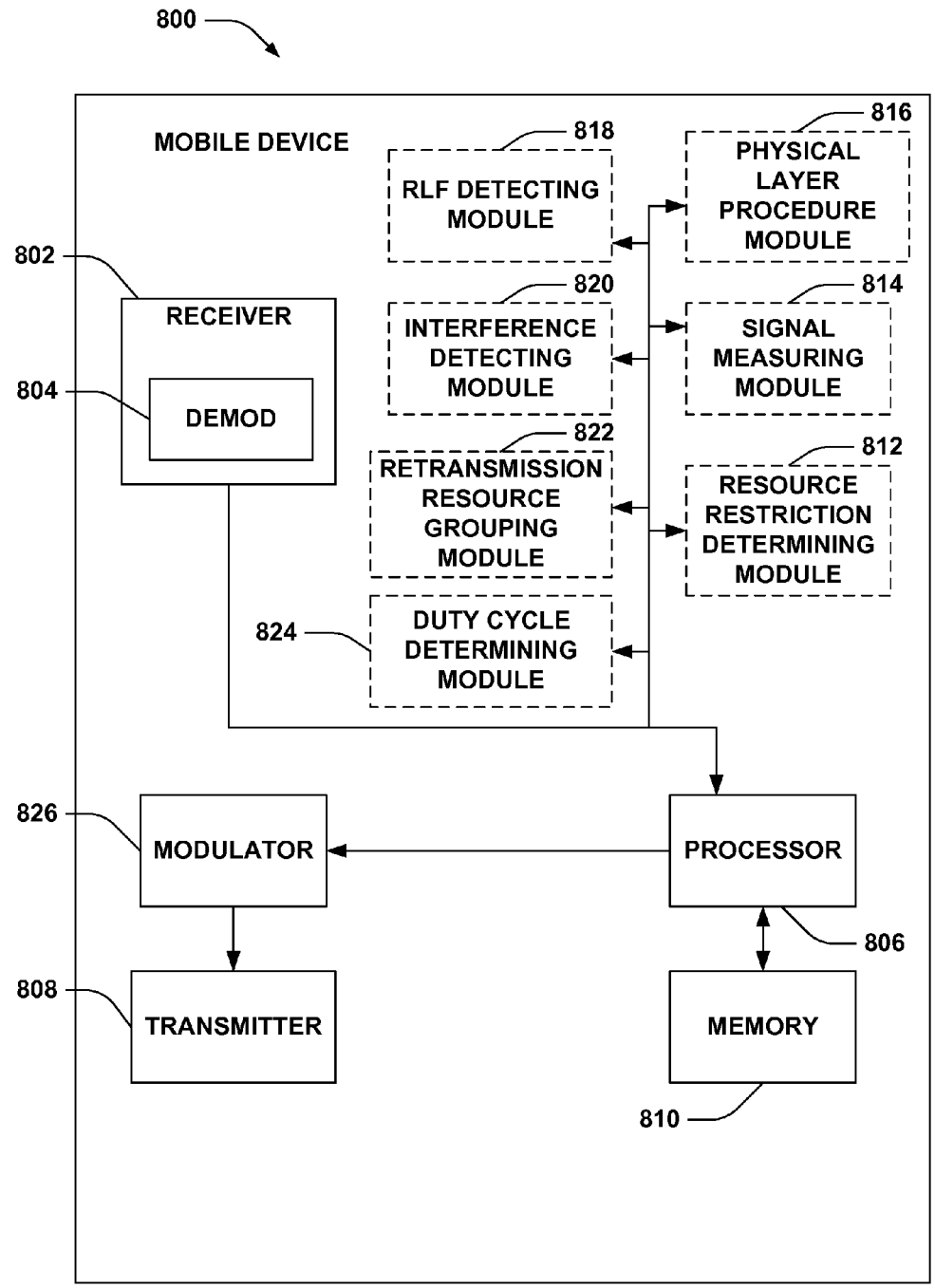
FIG. 8 is a block diagram of an aspect of an example mobile device in accordance with aspects described herein.

FIG. 8 is an illustration of a mobile device 800 that facilitates determining resources over which to measure signals from a base station. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 808, a processor that controls one or more components of mobile device 800, and/or a processor that both analyzes information received by receiver 802, generates information for transmission by transmitter 808, and controls one or more components of mobile device 800.

Mobile device 800 can additionally comprise memory 810 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 810 can additionally store protocols and/or algorithms associated with estimating and/or utilizing a channel (e.g., performance based, capacity based, etc.).

It will be appreciated that the data store (e.g., memory 810) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and any other suitable types of memory.

In one example, receiver 802 can be similar to a receiving module 202. Processor 806 can further be optionally operatively coupled to a resource restriction determining module 812, which can be similar to resource restriction determining module 204, a signal measuring module 814, which can be similar to signal measuring module 206, physical layer procedure module 816, which can be similar to physical layer procedure module 208, a RLF detecting module 818, which can be similar to RLF detecting module 210, an interference detecting module 820, which can be similar to interference detecting module 212, a retransmission resource grouping module 822, which can be similar to retransmission resource grouping module 214, and/or a duty cycle determining module 824, which can be similar to duty cycle determining module 216.

Mobile device 800 still further comprises a modulator 826 that modulates signals for transmission by transmitter 808 to, for instance, a base station, another mobile device, etc. Moreover, for example, mobile device 800 can comprise multiple transmitters 808 for multiple network interfaces, as described. Although depicted as being separate from the processor 806, it is to be appreciated that the resource restriction determining module 812, signal measuring module 814, physical layer procedure module 816, RLF detecting module 818, interference detecting module 820, retransmission resource grouping module 822, duty cycle determining module 824, demodulator 804, and/or modulator 826 can be part of the processor 806 or multiple processors (not shown), and/or stored as instructions in memory 810 for execution by processor 806.

Figure 9:
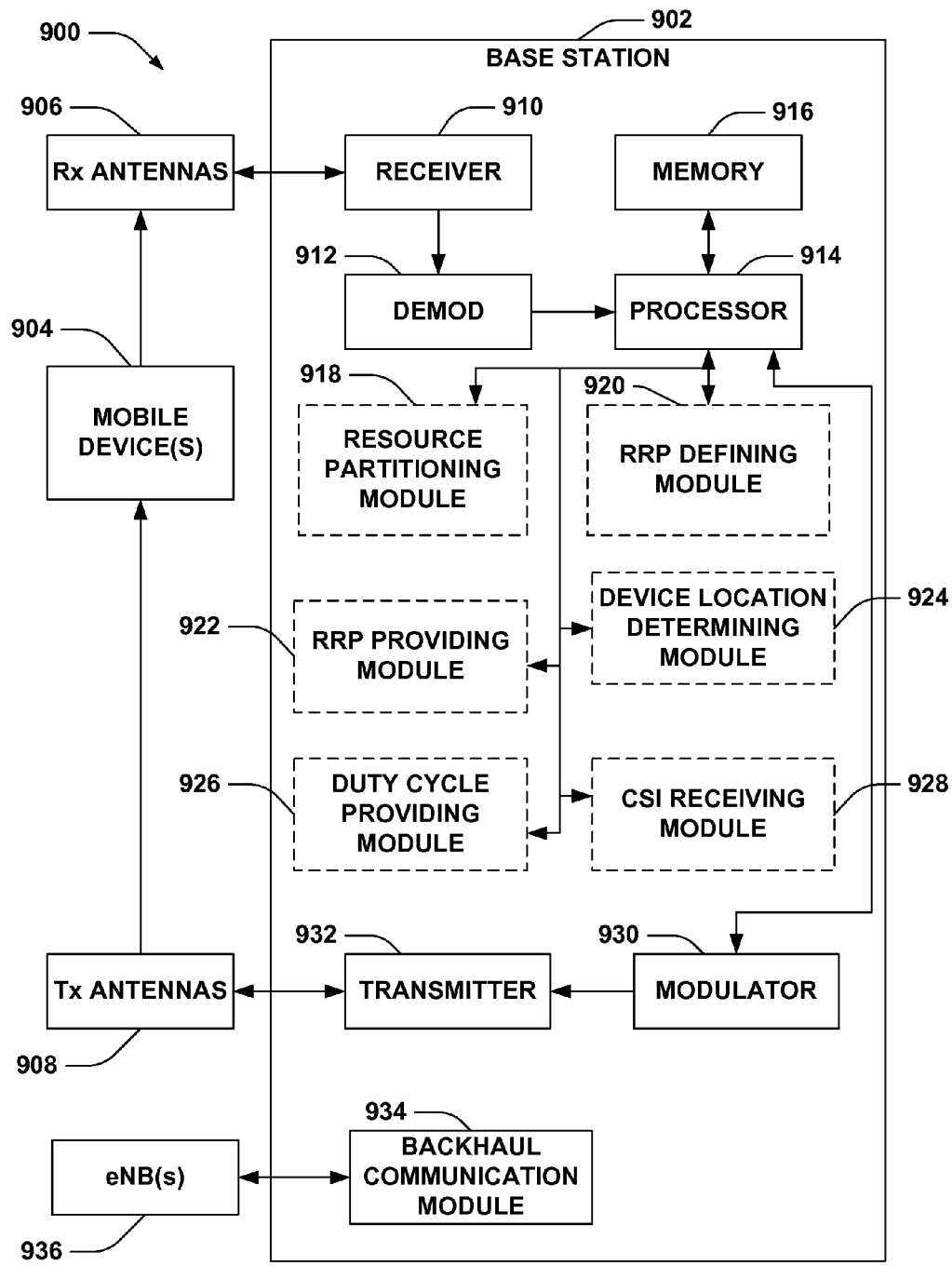
FIG. 9 is a block diagram of an aspect of an example system in accordance with aspects described herein.

FIG. 9 is an illustration of a system 900 that facilitates communicating with one or more devices using wireless communications. System 900 comprises a base station 902, which can be substantially any base station (e.g., a low power base station, such as a femto node, pico node, etc., mobile base station . . . ), a relay, etc., having a receiver 910 that receives signal(s) from one or more mobile devices 904 through a plurality of receive antennas 906 (e.g., which can be of multiple network technologies, as described), and a transmitter 932 that transmits to the one or more mobile devices 904 through a plurality of transmit antennas 908 (e.g., which can be of multiple network technologies, as described). In addition, in one example, transmitter 932 can transmit to the mobile devices 904 over a wired front link. Receiver 910 can receive information from one or more receive antennas 906 and is operatively associated with a demodulator 912 that demodulates received information. In addition, in an example, receiver 910 can receive from a wired backhaul link. Moreover, though shown as separate antennas, it is to be appreciated that at least one transmit antenna 908 can be combined with at least one receive antenna 906 as a single antenna.

Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein.

Processor 914 is further optionally coupled to a resource partitioning module 918, which can be similar to resource partitioning module 302, a RRP defining module 920, which can be similar to RRP defining module 304, a RRP providing module 922, which can be similar to RRP providing module 306, a device location determining module 924, which can be similar to device location determining module 308, a duty cycle providing module 926, which can be similar to duty cycle providing module 310 and/or a CSI receiving module 928, which can be similar to CSI receiving module 312. Moreover, for example, processor 914 can modulate signals to be transmitted using modulator 930, and transmit modulated signals using the transmitter 932. Transmitter 932 can transmit signals to mobile devices 904 over Tx antennas 908.

In addition, base station 902 can include a backhaul communication module 934 for communicating with one or more eNBs 936 over a backhaul interface. For example, backhaul communication module 934 can communicate with the eNBs 936 over a wired or wireless backhaul link using one or more backhaul interfaces (e.g., X2 interface in LTE). Where the backhaul link is wireless for example, it is to be appreciated that base station 902 can utilize Rx antennas 906 and receiver 910 to receive communications from eNBs 936, and/or Tx antennas 908 and transmitter 932 to communicate signals to eNBs 936.

Furthermore, although depicted as being separate from the processor 914, it is to be appreciated that the resource partitioning module 918, RRP defining module 920, RRP providing module 922, device location determining module 924, duty cycle providing module 926, CSI receiving module 928, backhaul communication module 934, demodulator 912, and/or modulator 930 can be part of the processor 914 or multiple processors (not shown), and/or stored as instructions in memory 916 for execution by processor 914.

Figure 10:
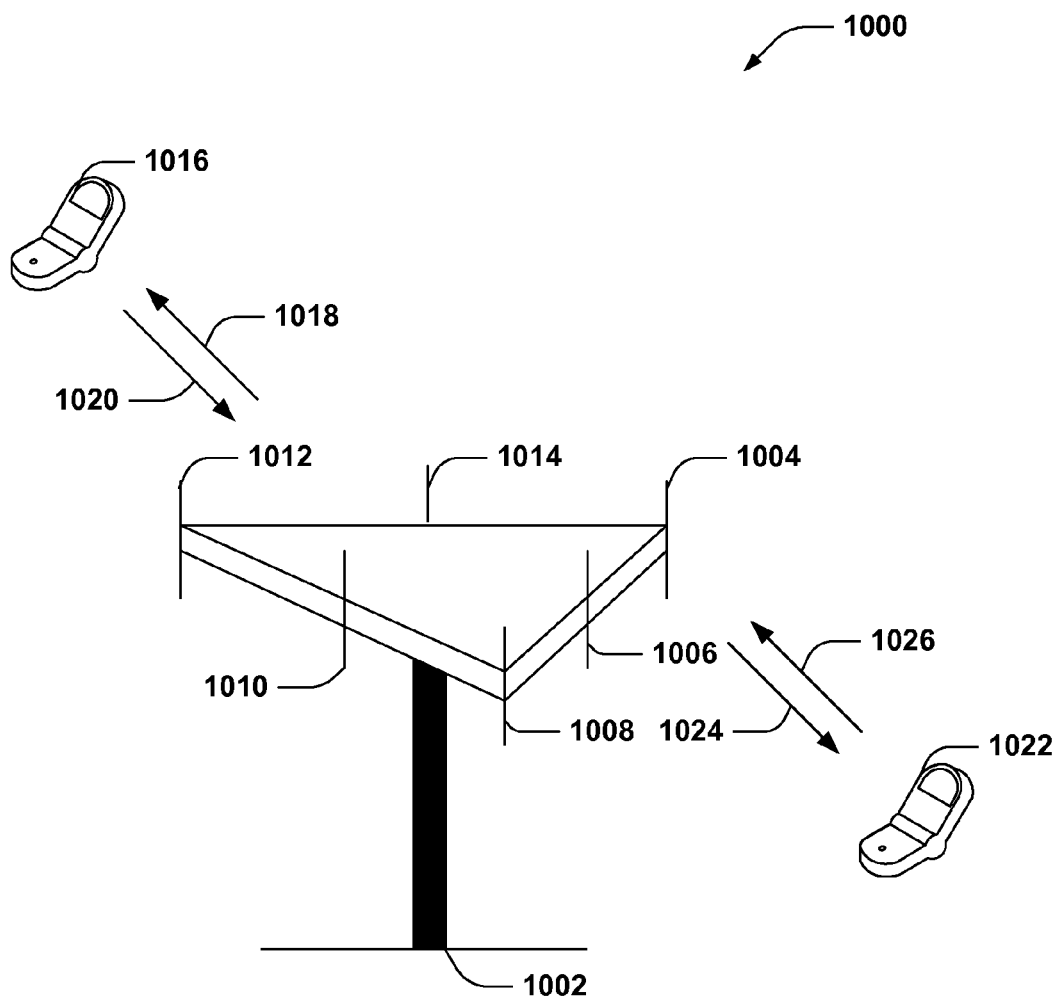
FIG. 10 is a block diagram of an aspect of a wireless communication system in accordance with various aspects set forth herein.

FIG. 10 illustrates a wireless communication system 1000 in accordance with various embodiments presented herein. System 1000 comprises a base station 1002 that can include multiple antenna groups. For example, one antenna group can include antennas 1004 and 1006, another group can comprise antennas 1008 and 1010, and an additional group can include antennas 1012 and 1014. Two antennas are illustrated for each antenna group; however, more or fewer antennas can be utilized for each group. Base station 1002 can additionally include a transmitter chain and a receiver chain, each of which can in turn comprise a plurality of components or modules associated with signal transmission and reception (e.g., processors, modulators, multiplexers, demodulators, demultiplexers, antennas, etc.), as is appreciated.

Base station 1002 can communicate with one or more mobile devices such as mobile device 1016 and mobile device 1022; however, it is to be appreciated that base station 1002 can communicate with substantially any number of mobile devices similar to mobile devices 1016 and 1022. Mobile devices 1016 and 1022 can be, for example, cellular phones, smart phones, laptops, handheld communication devices, handheld computing devices, satellite radios, global positioning systems, PDAs, and/or any other suitable device for communicating over wireless communication system 1000. As depicted, mobile device 1016 is in communication with antennas 1012 and 1014, where antennas 1012 and 1014 transmit information to mobile device 1016 over a forward link 1018 and receive information from mobile device 1016 over a reverse link 1020. Moreover, mobile device 1022 is in communication with antennas 1004 and 1006, where antennas 1004 and 1006 transmit information to mobile device 1022 over a forward link 1024 and receive information from mobile device 1022 over a reverse link 1026. In a frequency division duplex (FDD) system, forward link 1018 can utilize a different frequency band than that used by reverse link 1020, and forward link 1024 can employ a different frequency band than that employed by reverse link 1026, for example. Further, in a time division duplex (TDD) system, forward link 1018 and reverse link 1020 can utilize a common frequency band and forward link 1024 and reverse link 1026 can utilize a common frequency band.

Each group of antennas and/or the area in which they are designated to communicate can be referred to as a sector of base station 1002. For example, antenna groups can be designed to communicate to mobile devices in a sector of the areas covered by base station 1002. In communication over forward links 1018 and 1024, the transmitting antennas of base station 1002 can utilize beamforming to improve signal-to-noise ratio of forward links 1018 and 1024 for mobile devices 1016 and 1022. Also, while base station 1002 utilizes beamforming to transmit to mobile devices 1016 and 1022 scattered randomly through an associated coverage, mobile devices in neighboring cells can be subject to less interference as compared to a base station transmitting through a single antenna to all its mobile devices. Moreover, mobile devices 1016 and 1022 can communicate directly with one another using a peer-to-peer or ad hoc technology as depicted. According to an example, system 1000 can be a multiple-input multiple-output (MIMO) communication system or similar system that allows assigning multiple carriers between base station 1002 and mobile devices 1016 and/or 1022. For example, base station 1002 can correspond to apparatus 300, and mobile devices 1016 and 1022 can correspond to apparatus 200 and can thus determining resources over which to measure signals from base station 1002 (e.g., based on a received RRP or otherwise).

Figure 11:
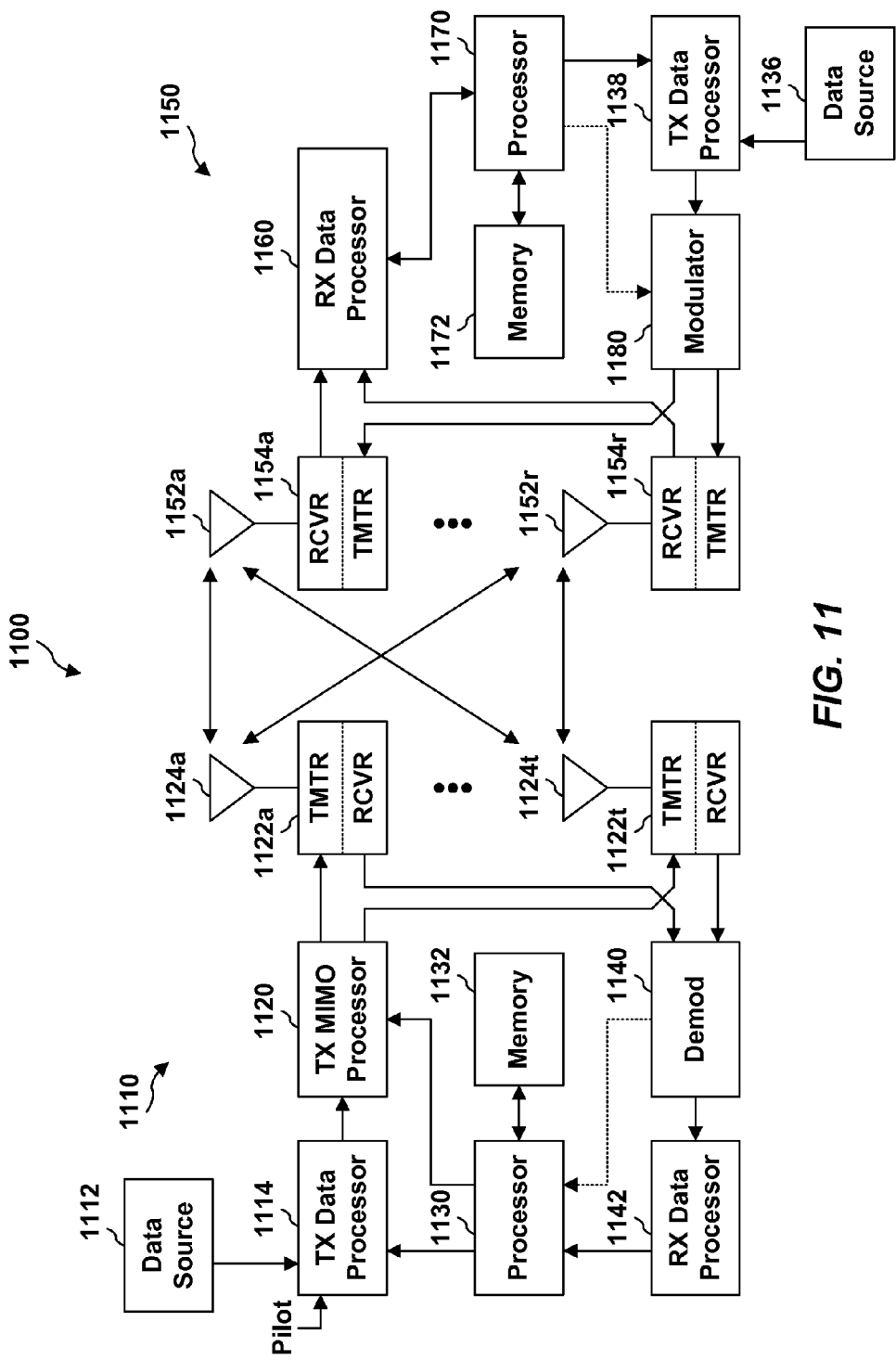
FIG. 11 is a schematic block diagram of an aspect of a wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-3, 9, and 10), subframe configurations (FIG. 4), methods (FIGS. 5-7), and/or mobile devices (FIG. 8) described herein to facilitate wireless communication there between. For example, components or functions of the systems and/or methods described herein can be part of a memory 1132 and/or 1172 or processors 1130 and/or 1170 described below, and/or can be executed by processors 1130 and/or 1170 to perform the disclosed functions.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Moreover, processors 1130 and 1170 can determine a set of resources over which to measure signals from a base station, generate or utilize a RRP, and/or the like.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communications, comprising:
receiving signals from a base station over a set of resources;
receiving one or more parameters related to a restricted resource pattern (RRP) for measuring signals from the base station over a first portion of resources from the set of resources, wherein the one or more parameters comprise an RRP bitmap, the RRP bitmap indicating measurement assignments over the set of resources;
detecting an interference level, over the set of resources, for the resources not specified for measurement by the RRP bitmap;
selecting a second portion of resources based on the interference level over the resources not specified for measurement by the RRP bitmap;
measuring signals over the first portion of resources based on the one or more parameters to determine a plurality of signal measurements;
measuring signals over the second portion of resources from the set of resources, to determine one or more additional signal measurements, the second portion of resources including the resources not specified for measurement by the RRP bitmap; and
performing one or more physical layer procedures based on a combination of the plurality of signal measurements and based on the one or more additional signal measurements.

2. The method of claim 1, wherein the RRP bitmap corresponds to a resource partitioning scheme used by the base station to negotiate communication resources with other base stations.

3. The method of claim 1, wherein the measuring signals comprises measuring signals over a subset of the first portion of resources as indicated by the RRP bitmap.

4. The method of claim 1, further comprising selecting the second portion of resources based in part on a retransmission scheme which groups the second portion of resources to at least some of the first portion of resources.

5. The method of claim 1, further comprising:
detecting a cross-subframe scheduling assignment; and
wherein the selecting the second portion of resources based on the cross-subframe scheduling assignment.

6. The method of claim 1, further comprising receiving a second resource bitmap from the base station, the second resource bitmap indicating a different portion of resources from the set of resources.

7. The method of claim 6, wherein the second resource bitmap is an interference bitmap that indicates the different portion of resources utilized by one or more other base stations.

8. The method of claim 7, further comprising:
measuring signals over the different portion of resources to determine one or more interfered signal measurements; and
performing one or more additional physical layer procedures based on the one or more interfered signal measurements.

9. The method of claim 1, wherein the receiving the one or more parameters related to a RRP comprises receiving or generating one or more duty cycle parameters.

10. The method of claim 9, wherein the one or more duty cycle parameters comprise a parameter specifying a length of a duty cycle, a parameter specifying an offset of the duty cycle, or a parameter specifying a maximum number of subframes to measure in the duty cycle.

11. The method of claim 1, wherein the one or more parameters relate to a length of the RRP based on at least one of a retransmission time period and a communication frame time period.

12. The method of claim 1, wherein the performing the one or more physical layer procedures comprises at least one of attempting to detect a radio link failure, reporting channel state information, or generating a measurement report based on the plurality of signal measurements.

13. The method of claim 1, wherein the combination of the plurality of signal measurements is an average of the plurality of signal measurements.

14. The method of claim 1, wherein the measuring signals over the first portion of resources comprises measuring signals received from the base station over a complementary set of resources, wherein the complementary set of resources is determined based on an interference bitmap received from the base station and the RRP bitmap, and wherein the interference bitmap specifies one or more interfered resources.

15. An apparatus for wireless communication, comprising:
means for receiving signals from a base station over a set of resources;
means for receiving one or more parameters related to a restricted resource pattern (RRP) for measuring signals from the base station over a first portion of resources over the set of resources, wherein the one or more parameters comprise an RRP bitmap, the RRP bitmap indicating measurement assignments over the set of resources;
means for detecting an interference level, over the set of resources, for the resources not specified for measurement by the RRP bitmap;
means for selecting a second portion of resources based on the interference level over the resources not specified for measurement by the RRP bitmap;
means for measuring signals over the first portion of resources based on the one or more parameters to determine a plurality of signal measurements;
means for measuring signals over the second portion of resources from the set of resources, to determine one or more additional signal measurements, the second portion of resources including the resources not specified for measurement by the RRP bitmap; and
means for performing one or more physical layer procedures based on a combination of the plurality of signal measurements and based on the one or more additional signal measurements.

16. The apparatus of claim 15, wherein the RRP bitmap corresponds to a resource partitioning scheme used by the base station.

17. An apparatus for wireless communication, comprising:
a memory; and
at least one processor coupled to the memory, and configured to:
receive signals from a base station over a set of resources;
receive one or more parameters related to a restricted resource pattern (RRP) for measuring signals from the base station over a first portion of resources from the set of resources, wherein the one or more parameters comprise an RRP bitmap, the RRP bitmap indicating measurement assignments over the set of resources;
detect an interference level, over the set of resources, for the resources not specified for measurement by the RRP bitmap;
select a second portion of resources based on the interference level over the resources not specified for measurement by the RRP bitmap;
measure signals over the first portion of resources based on the one or more parameters to determine a plurality of signal measurements;
measure signals over the second portion of resources from the set of resources, to determine one or more additional signal measurements, the second portion of resources including the resources not specified for measurement by the RRP bitmap; and
perform one or more physical layer procedures based on a combination of the plurality of signal measurements and based on the one or more additional signal measurements.

18. The apparatus of claim 17, wherein the RRP bitmap corresponds to a resource partitioning scheme used by the base station.

19. The apparatus of claim 17, wherein the at least one processor measures signals over a subset of the first portion of resources as indicated by the RRP bitmap.

20. The apparatus of claim 19, wherein the at least one processor is further configured to measure signals over the second portion of resources from the set of resources, to determine one or more additional signal measurements, the second portion of resources including the resources not specified for measurement by the RRP bitmap.

21. The apparatus of claim 20, wherein the at least one processor is further configured to select the second portion of resources based in part on a retransmission scheme which groups the second portion of resources with at least some of the first portion of resources.

22. The apparatus of claim 20, wherein the at least one processor is further configured to detect a cross-subframe scheduling assignment, and select the second portion of resources based on the cross-subframe scheduling assignment.

23. The apparatus of claim 17, wherein the at least one processor is further configured to receive a second resource bitmap from the base station, the second resource bitmap indicating a different portion of resources from the set of resources.

24. The apparatus of claim 23, wherein the second resource bitmap is an interference bitmap that indicates the different portion of resources utilized by one or more other base stations.

25. The method of claim 17, wherein the combination of the plurality of signal measurements is an average of the plurality of signal measurements.

26. A computer program product for wireless communication, that is stored on a non-transitory computer-readable medium, and comprising code for causing at least one processor to:
receive signals from a base station over a set of resources;
receive one or more parameters related to a restricted resource pattern (RRP) for measuring signals from the base station over a first portion of resources from the set of resources, wherein the one or more parameters comprise an RRP bitmap, the RRP bitmap indicating measurement assignments over the set of resources;
detect an interference level, over the set of resources, for the resources not specified for measurement by the RRP bitmap;

select a second portion of resources based on the interference level over the resources not specified for measurement by the RRP bitmap;
measure signals over the first portion of resources based on the one or more parameters to determine a plurality of signal measurements;
measure signals over the second portion of resources from the set of resources, to determine one or more additional signal measurements, the second portion of resources including the resources not specified for measurement by the RRP bitmap; and
perform one or more physical layer procedures based on a combination of the plurality of signal measurements and based on the one or more additional signal measurements.

27. The computer program product of claim 26, wherein the RRP bitmap corresponds to a resource partitioning scheme used by the base station.

28. A method for wireless communications, comprising:
receiving signals from a base station over a set of resources;
receiving one or more parameters related to a restricted resource pattern (RRP) for measuring signals from the base station over a first portion of resources from the set of resources, wherein the one or more parameters comprise an RRP bitmap, the RRP bitmap indicating measurement assignments over the set of resources;
measuring signals over the first portion of resources based on the one or more parameters to determine a plurality of signal measurements;
modifying the RRP bitmap to indicate measurements over at least some of a second portion of resources, the second portion of resources including resources not specified for measurement by the RRP bitmap;
measuring signals over the second portion of resources from the set of resources, to determine one or more additional signal measurements; and
performing one or more physical layer procedures based on a combination of the plurality of signal measurements and the one or more additional signal measurements.

29. The method of claim 28, wherein the RRP bitmap corresponds to a resource partitioning scheme used by the base station to negotiate communication resources with other base stations.

30. The method of claim 28, wherein the measuring signals comprises measuring signals over a subset of the first portion of resources as indicated by the RRP bitmap.

31. The method of claim 28, further comprising selecting the second portion of resources based in part on a retransmission scheme which groups the second portion of resources to at least some of the first portion of resources.

32. The method of claim 28, further comprising:
detecting a cross-subframe scheduling assignment; and
selecting the second portion of resources based on the cross-subframe scheduling assignment.

33. The method of claim 28, further comprising receiving a second resource bitmap from the base station, the second resource bitmap indicating a different portion of resources from the set of resources.

34. The method of claim 28, wherein the second resource bitmap is an interference bitmap that indicates the different portion of resources utilized by one or more other base stations.

35. The method of claim 28, wherein the receiving the one or more parameters related to a RRP comprises receiving or generating one or more duty cycle parameters.

36. The method of claim 35, further comprising:
measuring signals over the different portion of resources to determine one or more interfered signal measurements; and
performing one or more additional physical layer procedures based on the one or more interfered signal measurements.

37. The method of claim 35, wherein the one or more duty cycle parameters comprise a parameter specifying a length of a duty cycle, a parameter specifying an offset of the duty cycle, or a parameter specifying a maximum number of subframes to measure in the duty cycle.

38. The method of claim 28, wherein the one or more parameters relate to a length of the RRP based on at least one of a retransmission time period and a communication frame time period.

39. The method of claim 28, wherein the performing the one or more physical layer procedures comprises at least one of attempting to detect a radio link failure, reporting channel state information, or generating a measurement report based on the plurality of signal measurements.

40. An apparatus for wireless communication, comprising:
means for receiving signals from a base station over a set of resources;
means for receiving one or more parameters related to a restricted resource pattern (RRP) for measuring signals from the base station over a first portion of resources from the set of resources, wherein the one or more parameters comprise an RRP bitmap, the RRP bitmap indicating measurement assignments over the set of resources;
means for measuring signals over the first portion of resources based on the one or more parameters to determine a plurality of signal measurements;
means for modifying the RRP bitmap to indicate measurements over at least some of a second portion of resources, the second portion of resources including resources not specified for measurement by the RRP bitmap;
means for measuring signals over the second portion of resources from the set of resources, to determine one or more additional signal measurements; and
means for performing one or more physical layer procedures based on a combination of the plurality of signal measurements and the one or more additional signal measurements.

41. An apparatus for wireless communication, comprising:
a memory; and
at least one processor coupled to the memory, and configured to:
receive signals from a base station over a set of resources;
receive one or more parameters related to a restricted resource pattern (RRP) for measuring signals from the base station over a first portion of resources from the set of resources, wherein the one or more parameters comprise an RRP bitmap, the RRP bitmap indicating measurement assignments over the set of resources;
measure signals over the first portion of resources based on the one or more parameters to determine a plurality of signal measurements;
modify the RRP bitmap to indicate measurements over at least some of a second portion of resources, the second portion of resources including resources not specified for measurement by the RRP bitmap;
measure signals over the second portion of resources from the set of resources, to determine one or more additional signal measurements; and perform one or more physical layer procedures based on a combination of the plurality of signal measurements and the one or more additional signal measurements.

42. A computer program product for wireless communication, that is stored on a non-transitory computer-readable medium, and comprising code for causing at least one processor to:

receive signals from a base station over a set of resources;

receive one or more parameters related to a restricted resource pattern (RRP) for measuring signals from the base station over a first portion of resources from the set of resources, wherein the one or more parameters comprise an RRP bitmap, the RRP bitmap indicating measurement assignments over the set of resources;

measure signals over the first portion of resources based on the one or more parameters to determine a plurality of signal measurements;

modify the RRP bitmap to indicate measurements over at least some of a second portion of resources, the second portion of resources including resources not specified for measurement by the RRP bitmap;

measure signals over the second portion of resources from the set of resources, to determine one or more additional signal measurements; and perform one or more physical layer procedures based on a combination of the plurality of signal measurements and the one or more additional signal measurements.

\* \* \* \* \*